United States Patent [19]

Nomura et al.

[11] Patent Number: 5,394,210
[45] Date of Patent: Feb. 28, 1995

[54] LINEAR GUIDING MECHANISM OF A ZOOM LENS BARREL OF A PHOTOGRAPHING OPTICAL SYSTEM

[75] Inventors: Hiroshi Nomura; Kazuyoshi Azegami, both of Tokyo, Japan

[73] Assignee: Asahi Kogaku Kogyo Kabushiki Kaisha, Tokyo, Japan

[21] Appl. No.: 167,038

[22] Filed: Dec. 16, 1993

[30] Foreign Application Priority Data

Dec. 25, 1992 [JP] Japan .................. 4-089035[U]
Dec. 25, 1992 [JP] Japan .................. 4-089036[U]

[51] Int. Cl.⁶ ......................................... G02B 7/00
[52] U.S. Cl. .................. 354/195.12; 359/694; 359/700; 359/704
[58] Field of Search ........... 354/195.1, 195.12; 359/694–696, 699–701, 704

[56] References Cited

U.S. PATENT DOCUMENTS

| | | | |
|---|---|---|---|
| 4,974,949 | 12/1990 | Tanaka | 359/704 |
| 5,144,494 | 9/1992 | Sekiguchi | 359/700 |
| 5,164,757 | 11/1992 | Nomura | 354/403 |
| 5,270,808 | 12/1993 | Nomura | 359/700 |

*Primary Examiner*—Michael L. Gellner
*Assistant Examiner*—J. K. Han
*Attorney, Agent, or Firm*—Sandler Greenblum & Bernstein

[57] ABSTRACT

A linear guiding mechanism of a zoom lens barrel including a stationary barrel which is fixed to a camera body, a cam ring which is threadedly engaged with the stationary barrel on an inside of the stationary barrel, and a linear guiding plate for linearly guiding a photographing optical system in an optical axis direction. The linear guiding plate is movable together with the cam ring in the optical axis direction, and the linear guiding plate is rotatable with respect to the cam ring. A linear guiding portion is provided on the stationary barrel for guiding the linear guiding plate in the optical axis direction. A section of the linear guiding potion is formed as an elongated hole. The remaining section of the linear guiding portion is formed as a blind-end groove on an inner peripheral surface of the stationary barrel.

18 Claims, 8 Drawing Sheets

LINEAR GUIDING MECHANISM OF A ZOOM LENS BARREL OF A PHOTOGRAPHING OPTICAL SYSTEM

BACKGROUND OF THE INVENTION

1. Field of the Invention

The present invention is directed to a linear guiding mechanism of a zoom lens barrel. The zoom lens barrel includes a lens group that is linearly guided in an optical axis direction by a linear guiding plate. The linear guiding plate is linearly guided by at least one linear guiding groove.

2. Description of Related Art

A zoom lens camera has been provided in which a cam ring is threadedly engaged (through helicoid gears) with a stationary barrel that is fixed to a camera body, the cam ring being arranged on the interior of the stationary barrel. In the camera, a zooming operation is effected in a manner such that a plurality of lens groups are moved in an optical axis direction in a predetermined manner in accordance with the rotation of the cam ring. In such a camera, it is desirable to provide a structure in which one of the plurality of lens groups is fixed to a linear guiding plate that is guided by at least one linear guiding groove, the cam ring being rotatable with respect to the linear guiding plate. The lens group is therefore prevented from rotating with respect to the stationary barrel.

In the case that the above-mentioned linear guiding groove is formed on the stationary barrel, it is preferable to make the linear guiding groove as long as possible in the optical axis direction to accommodate the movement of the linear guiding plate and, at the same time, reduce the weight of the stationary barrel, thereby reducing the weight of the zoom lens barrel of the camera.

In the camera having the above-noted structure, it is also possible to provide a mechanism for transmitting the driving force of the motor to the cam ring. In such a mechanism, a circumferential gear is provided on an outer peripheral surface of the cam ring, and a final gear of a gear train provided on the camera body is engaged with the circumferential gear. In the camera having such a structure, if the final gear is supported on the camera body, a predetermined distance between the axes of the circumferential gear and the final gear cannot be ensured. Since the position of the stationary barrel relative to the camera body is not exact, due to limitations in the precision of the manufacturing process, the gears cannot be expected to be brought into precise engagement. Furthermore, it is likely that a certain degree of play between the cam ring and the stationary barrel is likely to exist. Therefore, when the cam ring is rotated by the rotation of the final gear, the axes of the cam ring and the stationary barrel might not be coincident, with the eccentricity being equivalent to the degree of play.

SUMMARY OF THE INVENTION

The primary object of the present invention is to provide a linear guiding mechanism for use in a zoom lens barrel that ensures a sufficient moving range for the linear guiding plate and that reduces the weight of the zoom lens barrel.

Another object of the present invention is to provide a linear guiding mechanism for use in a zoom lens barrel that minimizes the eccentricity of the cam ring with respect to the stationary barrel when the cam ring is rotated.

To achieve the object mentioned above, according to the present invention, a linear guiding mechanism of a zoom lens barrel is provided having a stationary barrel which is fixed to a camera body, a cam ring which is threadedly engaged with the stationary barrel on an inside of the stationary barrel, and a linear guiding plate which is movable together with the cam ring in an optical axis direction. The cam ring is rotatable with respect to the linear guiding plate. Furthermore, a lens group is provided which is a component of a zoom lens optical system and which is guided by the linear guiding plate in a direction of the optical axis. A position of the lens group is varied in the optical axis direction by rotation of the cam ring. A linear guiding portion which is formed on the stationary barrel for guiding the linear guiding plate in the optical axis direction is also provided. A section of the linear guiding portion is formed as an elongated hole. The remaining section of the linear guiding portion is formed as a blind-end groove on an inner peripheral surface of the stationary barrel.

With this arrangement, since a predetermined section of the linear guiding portion is formed as a blind-end groove and the remaining section of the linear guiding portion is formed as an elongated hole, it is possible to provide a sufficient moving range for the linear guiding plate while minimizing the weight of the stationary barrel.

A linear guiding mechanism of a zoom lens barrel, including a stationary barrel which is fixed to a camera body, a cam ring which is threadedly engaged with the stationary barrel on an inside of the stationary barrel, and a linear guiding plate for linearly guiding a photographing optical system in an optical axis direction, is provided. The linear guiding plate is movable together with the cam ring in the optical axis direction, and the cam ring is rotatable with respect to the linear guiding plate. The mechanism further includes a linear guiding groove which is provided on the stationary barrel, wherein a guided projection, formed on the linear guiding plate, is slidably engaged in the linear guiding groove to guide the linear guiding plate in the optical axis direction. A driving gear for rotating the cam ring is provided, and the driving gear is supported in the linear guiding groove with a lengthwise direction of the driving gear being parallel to the linear guiding groove. In this arrangement, the driving gear is engaged with a circumferential gear formed on an outer peripheral surface of the cam ring and the guided projection of the linear guiding plate is provided in the vicinity of said driving gear.

BRIEF DESCRIPTION OF THE DRAWINGS

The invention will be described below in detail with reference to the accompanying drawings, in which.

DESCRIPTION OF THE PREFERRED EMBODIMENTS

Figure 1:
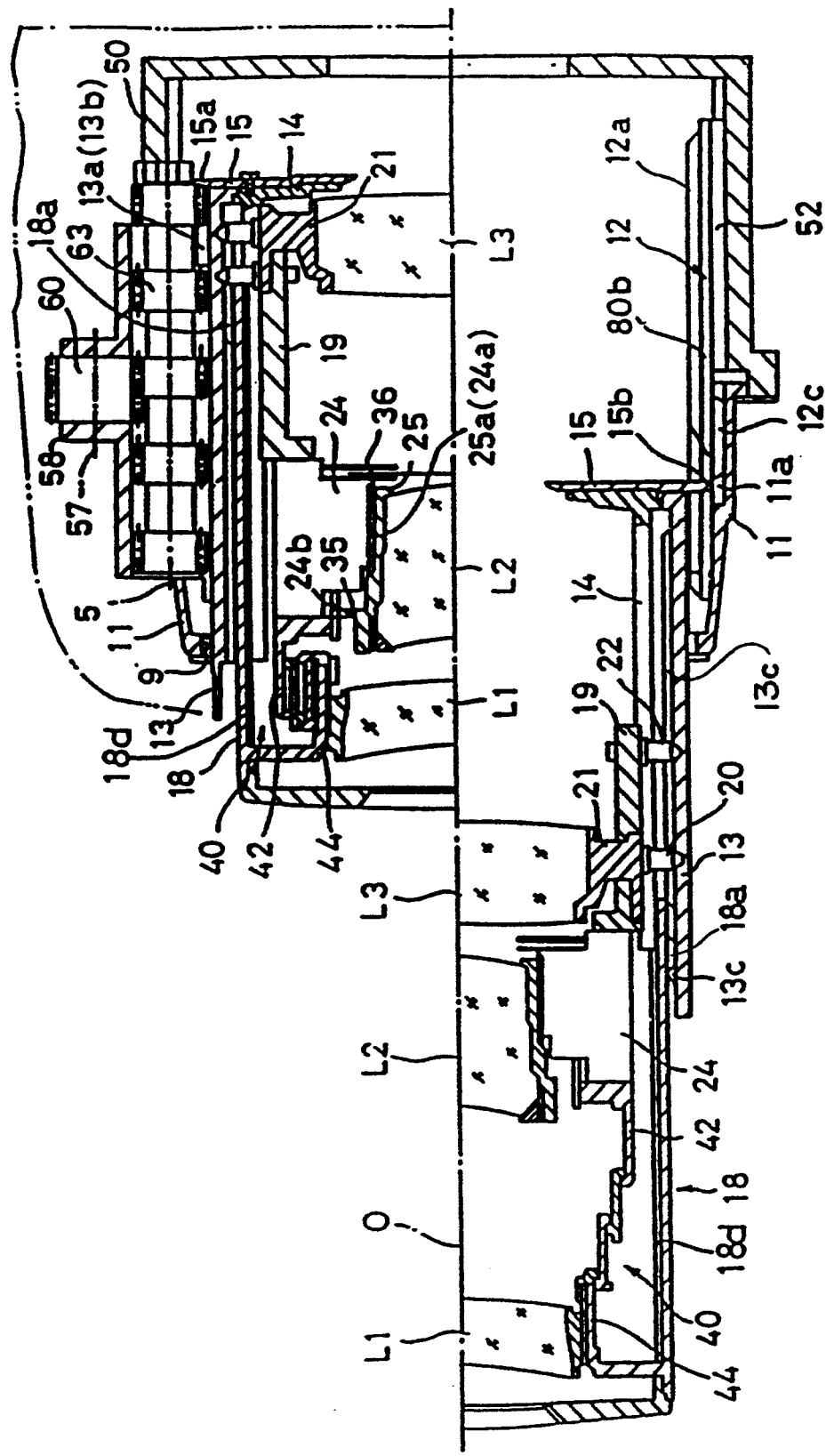
FIG. 1 is a longitudinal sectional view of a zoom lens barrel of a lens shutter type camera to which the present invention is applied, an upper half showing the zoom lens barrel in a retracted state, and a lower half showing the zoom lens barrel in a fully projected state.
Figure 2:
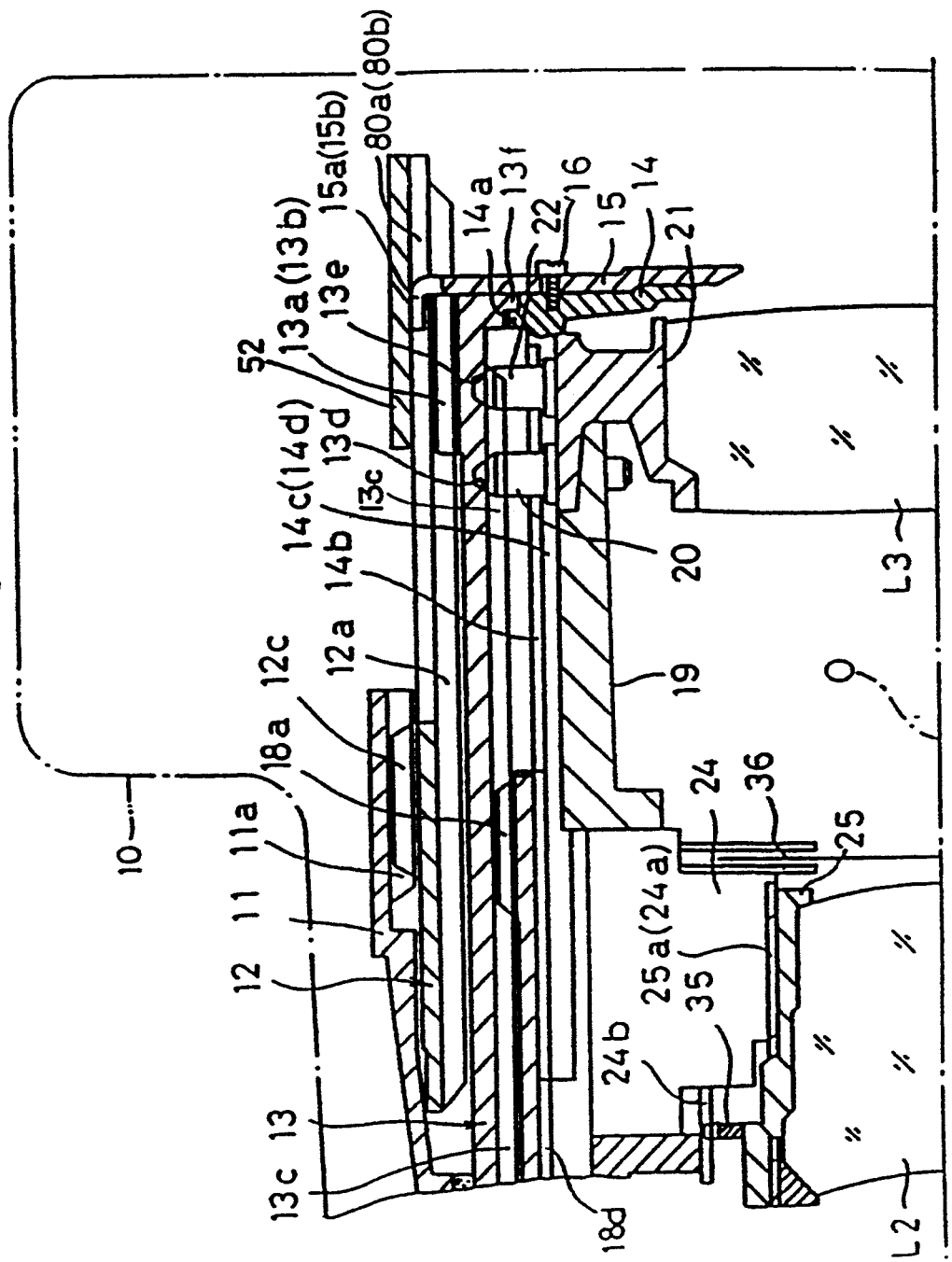
FIG. 2 is an enlarged longitudinal sectional view of a portion of the upper half of the zoom lens barrel of FIG. 1, showing a different cross-section thereof.

As shown in FIGS. 1 and 2, a zoom lens barrel of a camera to which the present invention is applied includes three lens groups, i.e., a first lens group L1, a second lens group L2, and a third lens group L3, which are moved in an optical axis direction O in a predetermined manner to effect a zooming operation. The second lens group L2 is moved to effect focusing.

Figure 7:
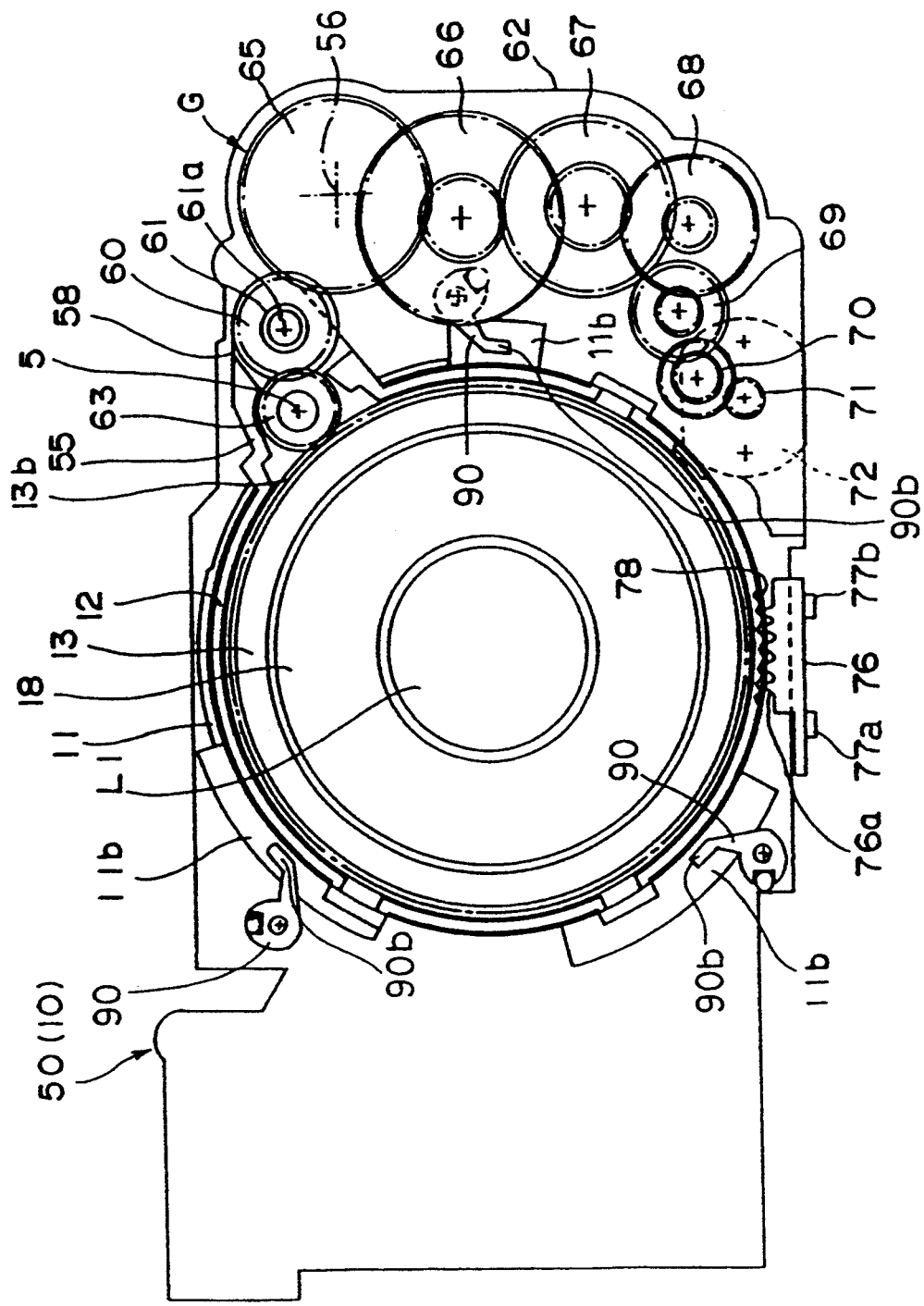
FIG. 7 is a front elevational view of the zoom lens barrel and gear train, illustrating the structure of the assembly relative to the camera body; and, FIG. 8 is a longitudinal sectional view of the camera and lens, illustrating the connecting structure of a transmitting gear and a final gear of a gear train that transmit a driving force to a cam ring of the camera.

A stationary block 50 is fixed to a camera body 10. The stationary block 50 is provided with an opening 51 to accommodate a stationary barrel 12. The stationary barrel 12 is provided on its outer peripheral surface with a plurality of linear keys (i.e., rotation restricting portions) 52. The stationary block 50 is integrally provided with an inner wall 51b in the opening 51. The inner wall 51b is provided thereon with a plurality of linear grooves 51a with which the corresponding linear keys 52 are slidably engaged. Accordingly, the stationary barrel 12 is engaged with the stationary block 50 by engaging the plurality of linear keys 52 with the corresponding linear grooves 51a. The stationary barrel 12 is thereby movable in the optical axis direction O. Rotational movement of the stationary barrel 12 is restricted with respect to the stationary block 50. The stationary barrel 12 is provided on its outer peripheral surface with a male helicoid gear 12c. The stationary barrel 12 is provided on its inner peripheral surface with a female helicoid gear 12a. The stationary barrel 12 is provided with an accommodating portion 55 which projects radially outward from the outer peripheral surface of the stationary barrel 12. The accommodating portion 55 supports a first pinion (i.e., driving gear) 63. The first pinion 63 is rotatable and oriented parallel to the optical axis direction O. The first pinion 63 is a final gear of a gear train G shown in FIG. 7.

The cam ring 13 is provided on its outer peripheral surface with a male helicoid gear 13a. The cam ring 13 is threadedly engaged with the stationary barrel 12 on the inside of the stationary barrel 12 with the male helicoid gear 13a engaging with the female helicoid gear 12a. The cam ring 13 is further provided with a circumferential gear 13b which is inclined in a lead direction of the male helicoid gear 13a. The circumferential gear 13b is engaged with the first pinion 63 which rotates at a predetermined position. The first pinion 63 is formed in a manner such that the length thereof in the optical axis direction O corresponds to the adjustable range of the circumferential gear 13b in the optical axis direction. The first pinion 63 has a shaft 5 on which the first pinion is fixed. One end of the shaft 5 is rotatably supported by the accommodating portion 55 through a supporting plate 54 fixed to the accommodating portion 55. The other end of the shaft 5 is rotatably fitted in a hole 74a formed on a supporting portion 74. The supporting portion 74 is integrally formed on the inner peripheral rear end of the stationary barrel 12. Accordingly, the first pinion 63 is provided on the stationary barrel 12 in a manner such that it can engage with the circumferential gear 13b, while the movement thereof is restricted in both the radial and optical axis directions with respect to the stationary barrel 12.

As shown in FIG. 2, the cam ring 13 is provided on its inner peripheral surface with a female helicoid gear 13c and inner cam grooves 13d and 13e for moving the first, second, and third lens groups L1, L2 and L3, respectively. Each of the inner cam grooves 13d and 13e are provided with a plurality of grooves having different circumferential positions with respect to each other. The plurality of grooves are formed by cutting away predetermined portions of the female helicoid gear 13c.

A supporting portion 57 is provided on the outer peripheral surface of the stationary barrel 12 at the rear of the supporting portion 55 in the optical axis direction O. The supporting portion 57 includes a pair of brackets 58 which are formed parallel to each other in the optical axis direction O. The brackets 58 hold a second pinion (i.e., transmitting gear) 60 therebetween. The second pinion 60 is a component of the gear train G that transmits a driving force of a motor 72 to the first pinion 63. The second pinion 60 rotates about a shaft 61 which is integral with the stationary block 50. The pair of brackets 58 have a pair of supporting holes 59 in which the shaft 61 is slidably fitted. Accordingly, the second pinion 60 is held between the pair of brackets 58. The second pinion 60 is engaged with the first pinion 63 through a hole 12d which is formed in the stationary barrel 12 between the pair of brackets 58. Accordingly, the second pinion 60 is provided on the stationary barrel 12 in a manner such that the movement of the second pinion 60 is restricted in the optical axis direction O by the pair of brackets 58.

Figure 3:
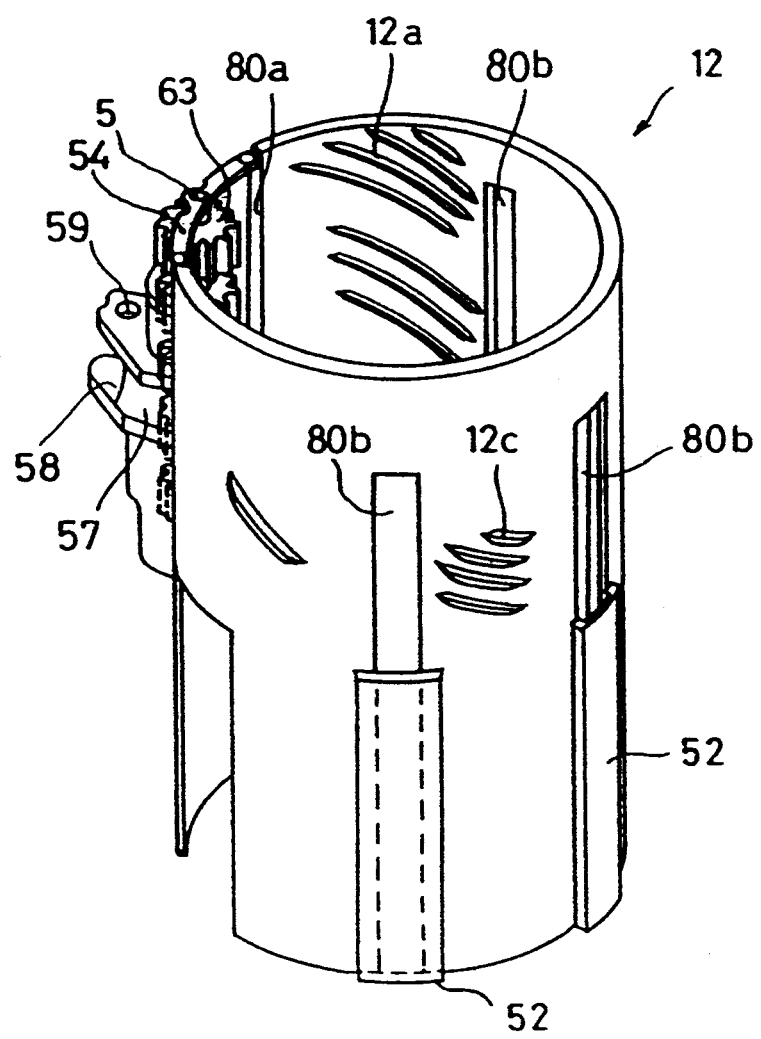
FIG. 3 is a isometric view of a stationary barrel of the zoom lens barrel.
Figure 4:
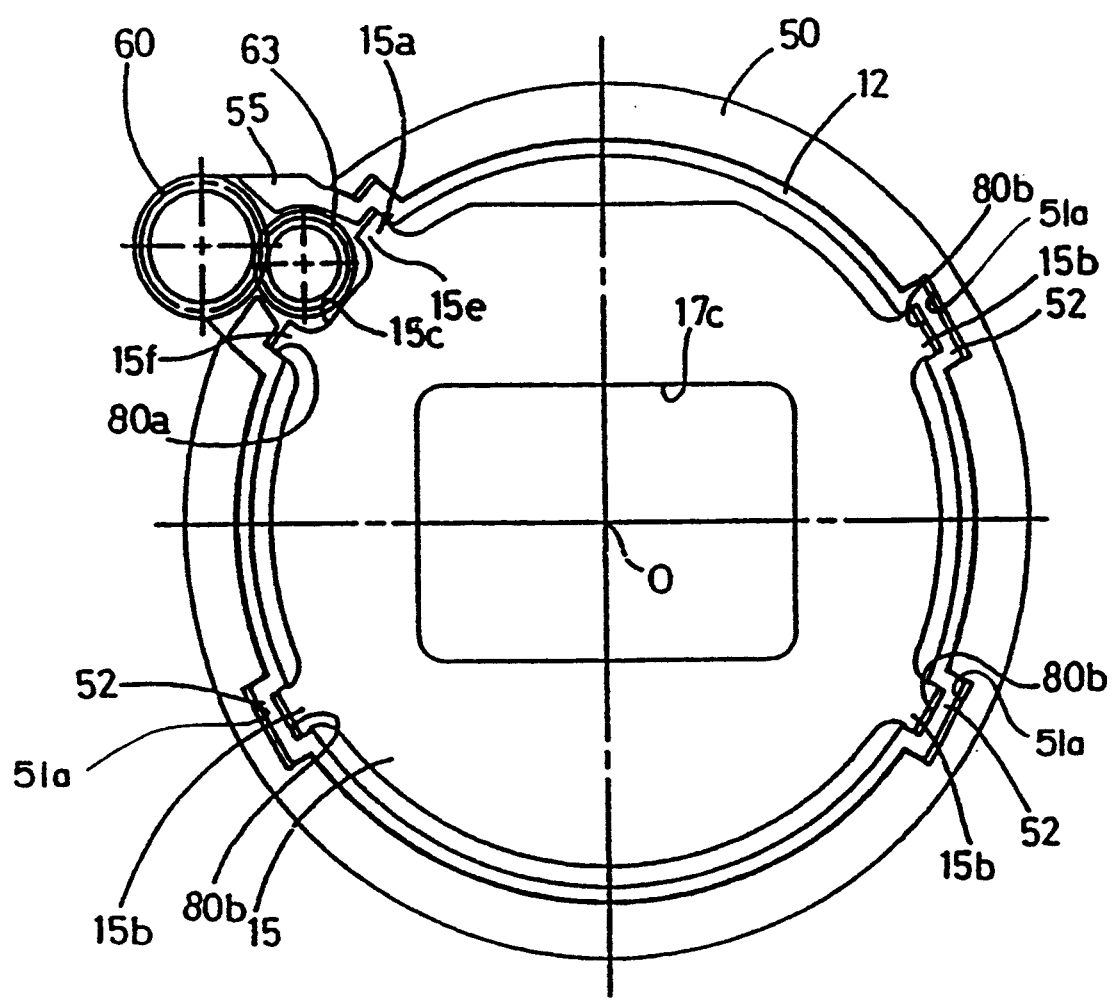
FIG. 4 is an outline view of the stationary barrel and a linear guiding plate, as viewed from the camera body side, illustrating the structure of the stationary barrel and the linear guiding plate.

As shown in FIGS. 3 and 4, a linear guiding groove (i.e., second linear guiding portion) 80a is provided on the inner peripheral surface of the stationary barrel 12. Three linear guiding grooves (i.e., first linear guiding portions) 80b are provided on the inner peripheral surface of the stationary barrel 12. The linear guiding groove 80a and three linear guiding grooves 80b are provided at four different circumferential positions on the inner peripheral surface of the stationary barrel 12.

The three linear guiding grooves 80b are each formed to have a lesser width than that of the linear guiding groove 80a in a circumferential direction of the stationary barrel 12. Each of the three linear guiding grooves 80b extends continuously from the lower end of the stationary barrel 12 to a predetermined point on the upper portion of the stationary barrel 12, as viewed in FIG. 3. The predetermined upper portions of the grooves 80b are formed as elongated holes in (i.e., extending through) the stationary barrel 12 and the remaining portions (lower sections) of the grooves 80b are formed as blind-end grooves in the stationary barrel 12. Bottom portions of the linear keys 52 (i.e., the sides of the linear keys 52 opposite the sides which engage with the linear grooves 51a) correspond to the bottom surfaces of the blind-end grooves.

The linear guiding groove 80a is engaged with a radial projection (i.e., guided projection) 15a formed on a linear guiding plate 15. The linear guiding plate 15 will be detailed hereinafter. The three linear guiding grooves 80b are engaged with three corresponding radial projections (i.e., guided projections) 15b formed on the linear guiding plate 15. The linear guiding groove 80a is provided at a position corresponding to the position of the accommodating portion 55. The first pinion 63 is positioned in the linear guiding groove 80a with an axis of the first pinion 63 orientated parallel to the optical axis O. A space having a predetermined width extending in the optical axis direction O is formed in the linear guiding groove 80a on both sides of the first pinion 63.

As shown in FIGS. 1 and 2, a linear guiding ring 14 is provided in the cam ring 13 with the outer peripheral surface of the linear guiding ring 14 contacting the inner peripheral surface of the cam ring 13. An outer circumferential flange 14a, which is in contact with an inner circumferential flange 13f provided on the cam ring 13, is formed at the rear end of the linear guiding ring 14. The linear guiding plate 15 is fixed to the rear end of the linear guiding ring 14 by screws 16. The linear guide plate 15 is provided in a manner such that the inner circumferential flange 13f is held between the linear guide plate 15 and the outer circumferential flange 14a and is rotatable therebetween. Accordingly, the linear guiding plate 15 permits relative rotation of the cam ring 13 and is movable together with the cam ring 13 in the optical axis direction O.

The radial projection 15a, and three radial projections 15b, are provided on the linear guiding plate 15 as shown in FIG. 4. The linear guiding plate 15 is positioned in the interior of the stationary barrel 12 with the radial projections 15a and 15b slidably engaging with the corresponding linear guiding grooves 80a and 80b, respectively. The shape of radial projection 15a corresponds to the linear guiding groove 80a so as to engage in a flush manner therewith. The radial projection 15a bifurcates into a pair of projections 15e and 15f with a recessed portion 15c located between the pair of projections 15e and 15f. The recessed portion 15c recedes (i.e., extends) from the first pinion 63. The recessed portion 15c is made only deep enough to prevent the first pinion 63 from contacting the bottom surface of the recess. The shape of the three radial projections 15b corresponds to the three linear guiding grooves 80b so as to engage therewith.

The female helicoid gear 13c is engaged with a male helicoid gear 18a which is formed on the outer peripheral surface of a first lens group supporting frame (i.e., lens barrel) 18. The first lens group L1 is supported by the first lens group supporting frame 18. The leads of the female helicoid gear 13c and of the male helicoid gear 18a are opposite those of the female helicoid gear 12a and male helicoid gear 13a. A cam pin 20 formed on the outer peripheral surface of a second lens group moving frame 19 is engaged with the inner cam groove 13d. A cam pin 22, which is formed on the outer peripheral surface of a third lens group supporting frame 21, to which the third lens group L3 is fixed, is engaged with the inner cam groove 13e. The cam pins 20 and 22 are engaged with linear guiding grooves 14c and 14d, respectively. Both of the linear guiding grooves 14c and 14d are parallel to the optical axis O and are located at different circumferential positions. Accordingly, the second and third lens groups L2 and L3 are linearly guided by the linear guiding ring 14. Therefore, the cam ring 13 rotates with respect to the linear guiding ring 14, i.e., the second and third lens groups L2 and L3, and moves together with the linear guiding ring 14 in the optical axis direction O.

As shown in FIGS. 1 and 2, the second lens group moving frame 19 is fixed to the rear end of an AF/AE shutter unit 24. An annular moving member 42 is fixed to the front end of the AF/AE unit 24. The AF/AE unit is provided on its inner peripheral surface with a female helicoid gear 24a. The female helicoid gear 24a is engaged with a male helicoid gear 25a formed on the outer peripheral surface of a second lens group supporting frame 25 to which a second lens group L2 is fixed. The AF/AE unit is provided with a driving pin 24b which is moved in a circumferential direction through predetermined angles corresponding to object distance information inputted from an object distance measuring apparatus (not shown). The driving pin 24b is engaged with an interlocking arm 35 radially projecting from the second lens group supporting frame 25. Accordingly, the second lens group supporting frame 25, i.e., the second lens group L2 is moved forwardly and rearwardly in the optical axis direction O for focusing, in accordance with a rotational angle of the driving pin 24b and the leads of the helicoid gears 24a and 25a. The AF/AE shutter unit 24 also opens and closes shutter blades 36 according to object brightness information inputted from an object brightness measuring apparatus (not shown).

A linear key 18d is formed on the inner peripheral surface of the first lens group supporting frame 18. The linear key 18d is engaged with the linear guiding groove 14b. The first lens group supporting frame 18, i.e., the first lens group L1 is linearly guided with the linear key 18d engaged with the linear guiding groove 14b. A light intercepting portion 40 is provided between an annular member 44 integrally formed on the first lens group supporting frame 18 and the annular moving member 42.

Figure 5:
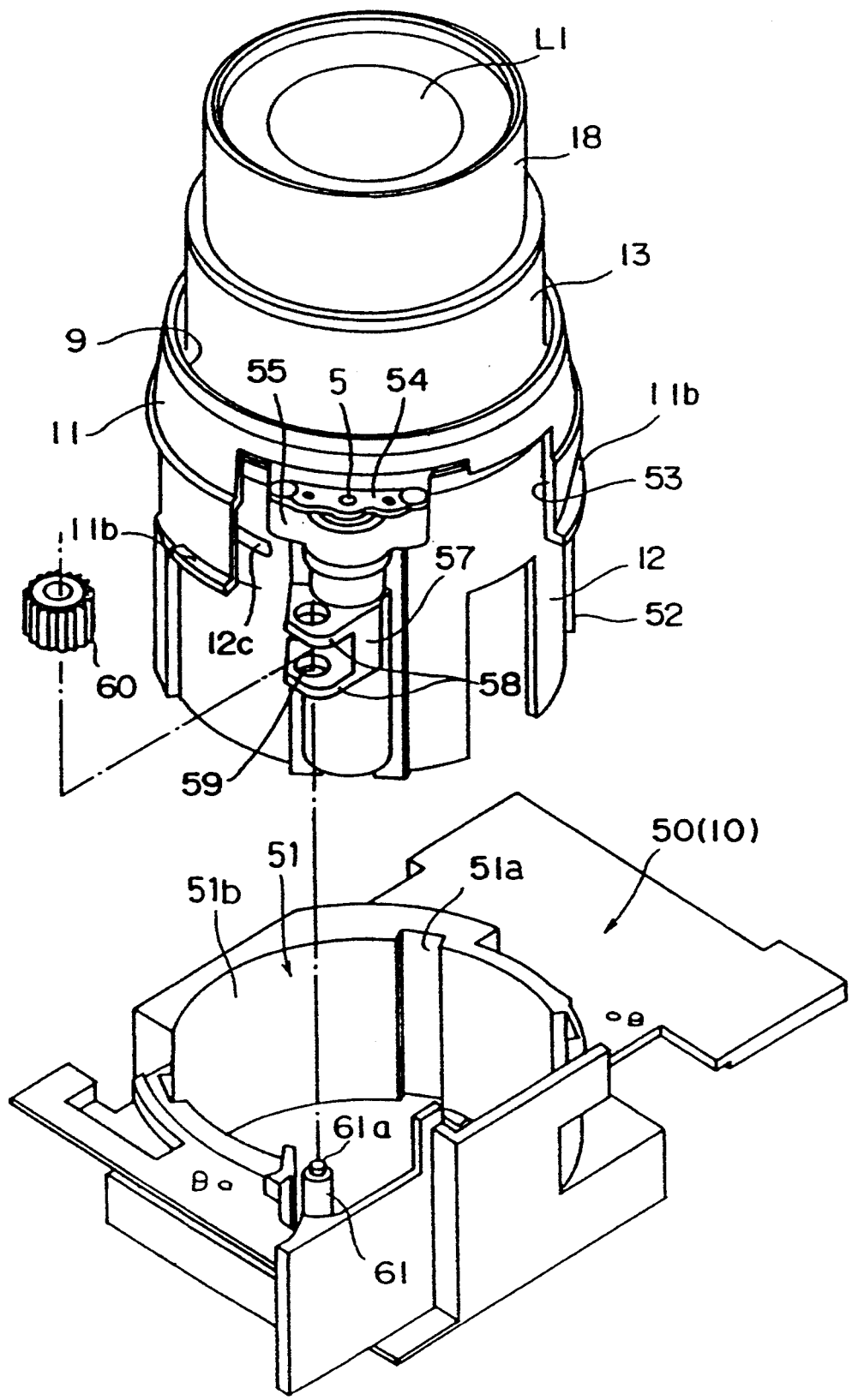
FIG. 5 is an exploded isometric view of a stationary block and the zoom lens barrel, illustrating the connecting structure of the stationary block and the zoom lens barrel.
Figure 8:
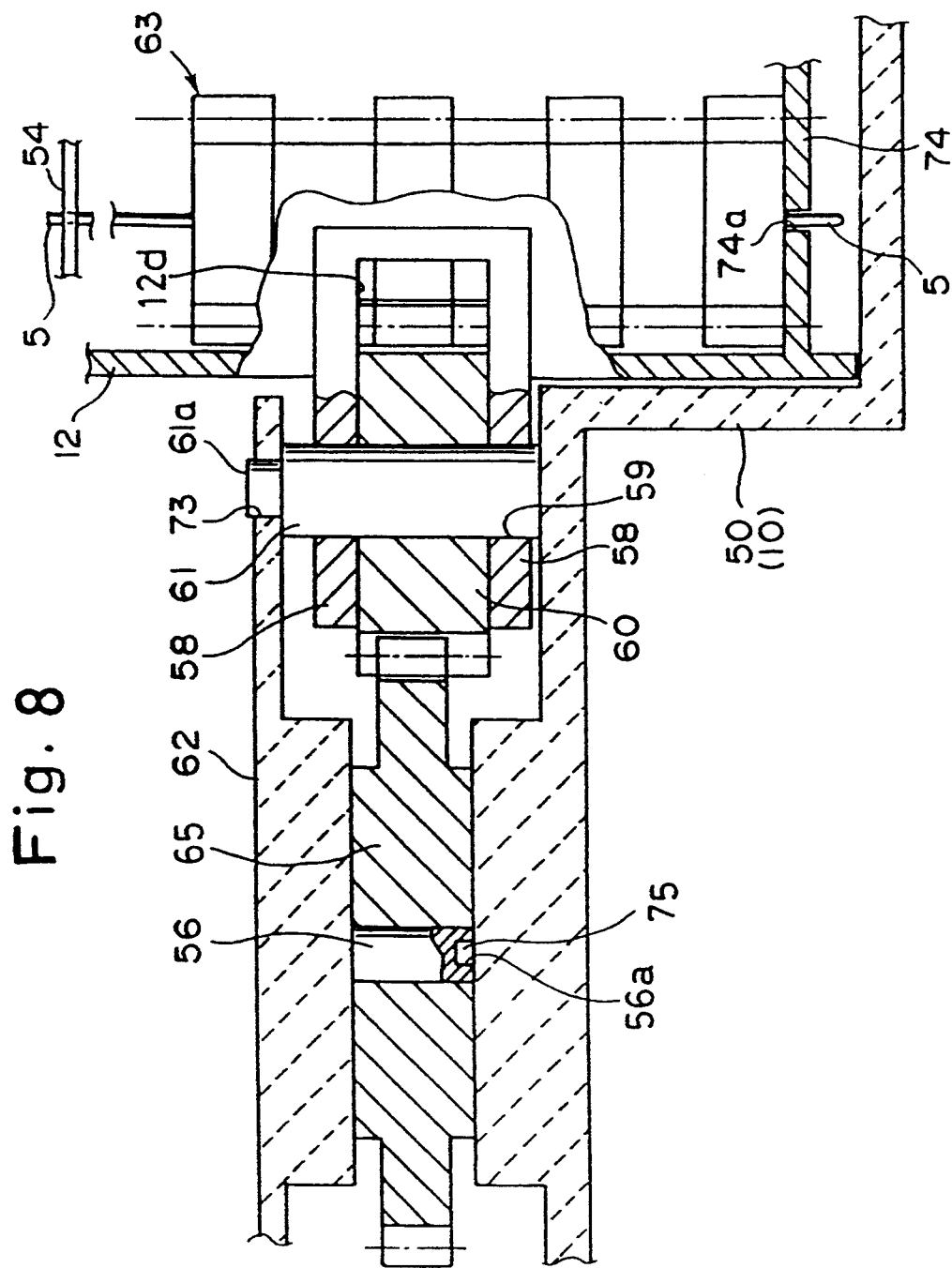

As shown in FIGS. 5 and 8, the shaft 61 is parallel to the optical axis O and extends in a direction passing through the centers of supporting holes 59 and the second pinion 60 with the second pinion 60 held between the pair of brackets 58. The shaft 61 allows the second pinion 60 to move in the optical axis direction with respect to the stationary block 50, the stationary barrel 12 being engaged with the stationary block 50 on the inner wall 8a.

Figure 6:
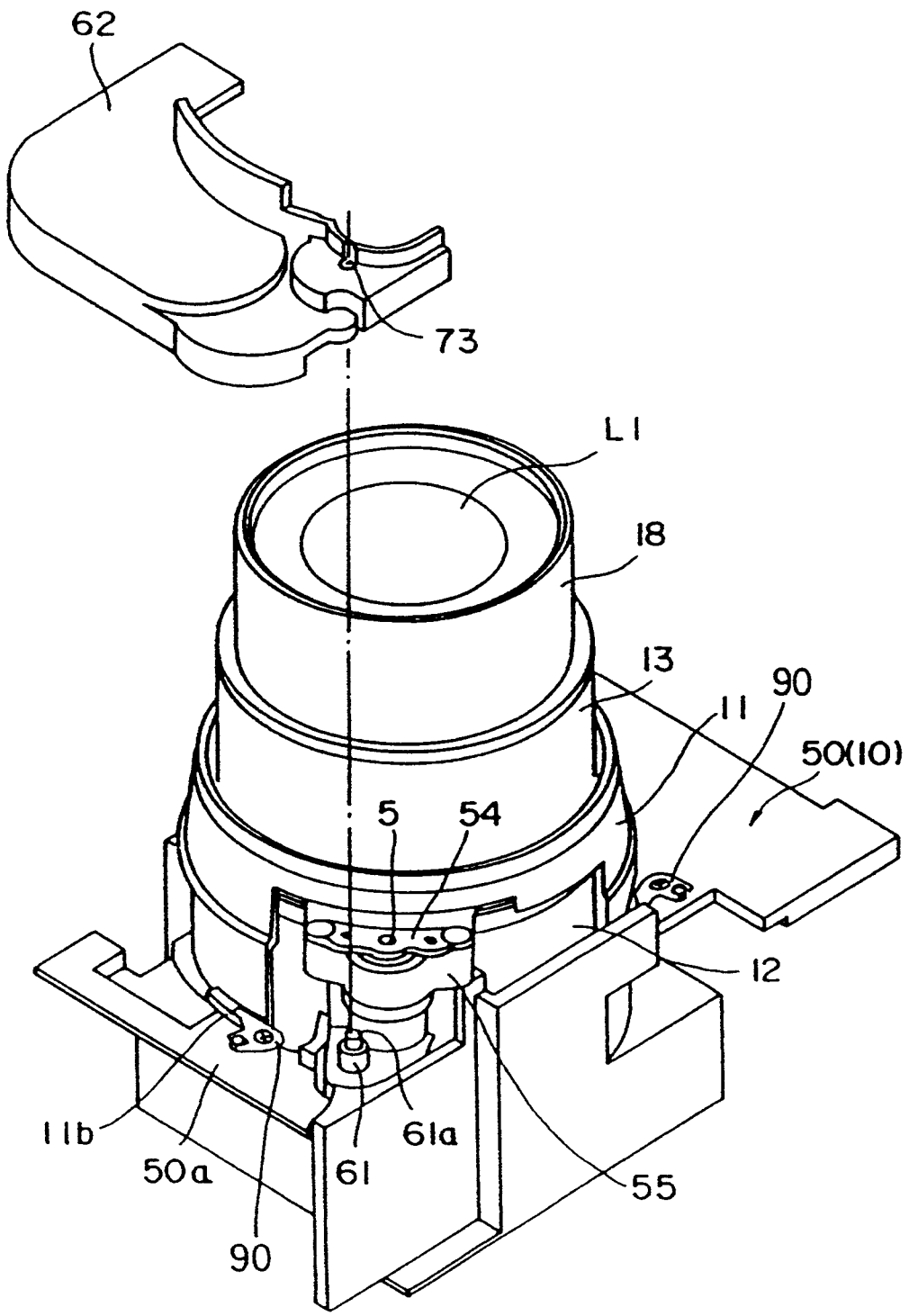
FIG. 6 is an isometric view of the stationary block and the zoom lens barrel in an assembled state.

Gears 65, 66, 67, 68, 69, and 70, which are components of the gear train G, are supported on a supporting member 62 (shown in FIG. 6) which is fixed to the stationary block 50 in a predetermined position. A positioning hole 73 is formed in the supporting member 62 at the position corresponding to that of a reduced diameter shaft portion 61a formed at the end of the rotational shaft 61.

An adjusting ring 11 is supported by the stationary barrel 12 with the male helicoid gear 12c engaging with a female helicoid gear 11a which is formed on the inner peripheral surface of the adjusting ring 11. Three sector flanges 11b, which project radially outward from the adjusting ring 11, are provided on the outer peripheral rear end of the adjusting ring 11 at three different circumferential positions. The adjusting ring 11 moves forwardly and rearwardly with respect to the stationary barrel 12 in the optical axis direction O when the adjusting ring 11 is rotated in forward and reverse directions, respectively. The movement of the three sector flanges 11b are restricted in the optical axis direction O by arm portions 90b of holding members 90 which are provided on a front wall 50a of the stationary block 50. The restriction of movement of the three sector flanges 11b results in the restriction of movement of the adjusting ring 11 in the optical axis direction O. Accordingly, rotation of the adjusting ring 11 results in the movement of the stationary barrel 12 in the optical axis direction O with respect to the adjusting ring 11, thereby varying the position of the third lens groups L3 with respect to an image plane, i.e., a film plane in the camera body 10. As a result, a back focus adjustment can be effected.

The adjusting ring 11 is provided on its outer peripheral rear end, at a predetermined circumferential position, with a sector gear 78. A positioning plate 76 is fixed on the stationary block 50 adjacent to the sector gear 78 by a screw 77b. The positioning plate 76 is formed thereon with an engaging gear 76a which is engaged with the sector gear 78. The positioning plate 76 is movable in the right and left directions of FIG. 7, with respect to the stationary block 50, when the screw 77b is loosened. The positioning plate 76 is fixed to the stationary block 50 by fastening (i.e., tightening) the screw 77b. Accordingly, when the positioning plate 76 is tightly fixed to the stationary block 50, rotational movement of the adjusting ring 11 is restricted by the engaging gear 76a engaged with the sector gear 78. A screw 77a is loosely fastened to the stationary block 50 through the positioning plate 76. The screw 77a is always in a loosely fastened state. It is only used for guiding the positioning plate 76 in a horizontal direction of FIG. 7.

The operation of the zoom lens barrel having the above-noted structure, to which the present invention is applied, is described below. When the first pinion 63, which is engaged with the circumferential gear 13b, is driven by the motor 72 through the gear train G in the maximum retracted state of the zoom lens barrel, the cam ring 13 rotates and projects forwardly in the optical axis direction O, in accordance with the male helicoid gear 13a and the female helicoid gear 12a.

The first lens group supporting frame 18, which is linearly guided by the linear guiding ring 14, is then further projected forwardly with respect to the cam ring 13 in accordance with the male helicoid gear 18a and the female helicoid gear 13c, whose lead directions are opposite each other. Likewise, the second lens group moving frame 19 and the third lens group supporting frame 21, which are linearly guided by the linear guiding ring 14, are projected forwardly in the optical axis direction O to effect a zooming operation in accordance with the rotation of the cam ring 13 which drives cam pins 20 and 22 through inner cam grooves 13d and 13e of the cam ring 13.

The second lens group moving frame 19 and the third lens group supporting frame 21, i.e., the second and third lens groups L2 and L3, are guided in the optical axis direction O by the linear guiding plate 15, which is connected to the third lens group supporting frame 21 through the linear guiding ring 14. Since the stationary barrel 12, which guides the linear guiding plate 15 in the optical axis direction O, has the three linear guiding grooves 80b whose predetermined portions are formed as blind-end grooves, the stationary barrel 12 has enough strength as a component part of the camera 10. Furthermore, since predetermined portions of the linear guiding grooves 80b are formed as elongated holes, it is possible to minimize the weight of the stationary barrel 12 without restricting the moving range of the linear guiding plate 15 in the optical axis direction O.

For comparisons sake, assume that the linear guiding plate 15 has only one radial projection 15b positioned at a point farthest from the first pinion 63, in other words, assume that the linear guiding plate 15 does not have the other two radial projections 15b and the radial projection 15a. In this arrangement, when the cam ring 13 is rotated by the rotation of the first pinion 63, the cam ring 13 would not exactly rotate about the optical axis O. Due to various existing loads, the cam ring 13 would rotate about an eccentric axis. Accordingly, smooth and proper movement of the cam ring 13 in the optical axis direction O with respect to the stationary barrel 12 could not be expected, due to frictional forces which would occur between the male and female helicoids 12a and 13a and between the radial projection 15b and the linear guiding groove 80b. Such would not be the case if the cam ring 13 were in a flush arrangement resulting in precise rotation about the optical axis O. However, according to the present invention, since the radial projection 15a, i.e., the pair of projections 15e and 15f, is engaged with the linear guiding groove 80a of the stationary barrel 12 in very close proximity with the first pinion 63, which supplies driving force of the motor 72 to the cam ring 13, the eccentricity of the cam ring 13 from the optical axis O can be restricted. As a result, the frictional forces which occur between the linear guiding groove 80a and the radial projection 15a and between the linear guiding grooves 80b and the radial projections 15b can be minimized. Hence, movement of the cam ring 13 in the optical axis direction O with respect to the stationary barrel 12 can be effected in a smooth manner, since the radial projections 15a and 15b move in the corresponding linear guiding grooves 80a and 80b while remaining flush therewith. Furthermore, the eccentricity of the cam ring 13 can be minimized. Accordingly, deviation from a predetermined position of the photographing optical system in the optical axis direction O, due to play in the cam ring 13 in a rotational direction and also deviation of the center of the photographing optical system due to play in the cam ring 13 in a radial direction, can be prevented.

As can be seen from the foregoing, according to the present invention, since the linear guiding grooves 80b are formed on the stationary barrel 12 in a manner such that the predetermined portions of the grooves 80b are formed as elongated holes in the stationary barrel 12, with the remaining portions of the grooves 80b being formed as blind-end grooves, it is possible to provide the linear guiding grooves 80b as well as the linear guiding groove 80a on the stationary barrel 12 without deteriorating the strength of the stationary barrel 12, while ensuring a sufficient moving range for the linear guiding plate 15 in the optical axis direction O. As a result, it is possible to reduce the weight of the zoom lens barrel, resulting in the reduction of the total weight of the camera.

Furthermore, according to the present invention, due to the arrangement in which; the linear guiding groove is provided on the stationary barrel in a manner that the linear guiding groove is parallel to the optical axis, in which the driving gear is supported in the linear guiding groove with a lengthwise direction of the driving gear being parallel to the linear guiding groove, and further in which the guided projection formed on the linear guiding plate is provided in the vicinity of the driving gear, the eccentricity of the cam ring with respect to the stationary barrel can be minimized or substantailly eliminated when the cam ring is rotated. Therefore, the deviation of the photographing optical sysytem in the optical axis direction from the predetermined point, due to the play of the cam ring in a rotational direction thereof and also the eccentricity of the photographing optical system due to the play of the cam ring in a radial direction thereof can be prevented.

Although the invention has been described with reference to particular means, materials and embodiments, it is to be understood that the invention is not limited to the particulars disclosed and extends to all equivalents within the scope of the claims.

We claim:

1. A linear guiding mechanism of a zoom lens barrel of a photographing optical system, comprising:
    a stationary block connected to a camera body;
    a barrel slidable with respect to said stationary block and precluded from rotation with respect to said stationary block;
    a cam ring threadedly engaged with said barrel on an inside of said barrel;
    a linear guiding plate for linearly guiding the photographing optical system in an optical axis direction, wherein said linear guiding plate is movable together with said cam ring in said optical axis direction, and wherein said cam ring is rotatable with respect to said linear guiding plate; and
    a linear guiding portion formed on said barrel, a part of said linear guiding portion on an inner peripheral surface of said barrel comprising means for guiding said linear guiding plate in said optical axis direction, a part of said linear guiding portion on an outer peripheral surface of said barrel comprising means for precluding rotation of said barrel with respect to said stationary block, wherein a section of said linear guiding portion is formed as an elongated hole, and wherein a remaining section of said linear guiding portion is formed as a blind-end groove on said inner peripheral surface of said barrel.

2. The linear guiding mechanism of claim 1, said means for precluding rotation of said barrel comprising a projection on said outer peripheral surface of said stationary barrel, wherein an inner portion of said projection forms a bottom of said blind-end groove.

3. The linear guiding mechanism of claim 2, wherein said projection constitutes a rotation restricting portion which restricts rotational movement of said barrel with respect to said camera body.

4. The linear guiding mechanism of claim 1, wherein said cam ring includes a circumferential gear on an outer peripheral surface of said cam ring, and wherein said barrel includes a gear which is engaged with said circumferential gear for rotating said cam ring.

5. The linear guiding mechanism of claim 4, wherein said linear guiding portion is formed in a manner such that a lengthwise direction of said linear guiding portion is parallel to said optical axis, and wherein said gear is supported by said barrel with a lengthwise direction of said gear being parallel to said lengthwise direction of said linear guiding portion 6. The linear guiding mechanism of claim 5, wherein said linear guiding plate includes at least one guided projection which is guided by said linear guiding portion in said optical axis direction.

7. The linear guiding mechanism of claim 6, wherein more than one linear guiding portion is provided on said barrel, and wherein a corresponding number of said at least one guided projection is provided on said linear guiding plate at positions corresponding to positions at which said more than one linear guiding portions are formed.

8. The linear guiding mechanism of claim 1, said stationary block defining an opening to accommodate said barrel and comprising a linear groove to slidably engage said means for precluding rotation of said barrel.

9. A linear guiding mechanism of a zoom lens barrel of a photographing optical system, comprising:
    a stationary block connected to a camera body;
    a barrel slidable with respect to said stationary block and precluded from rotation with respect to said stationary block;
    a cam ring which is threadedly engaged with said barrel on an inside of said barrel;
    a linear guiding plate for linearly guiding the photographing optical system in an optical axis direction, wherein said linear guiding plate is movable together with said cam ring in said optical axis direction, and wherein said cam ring is rotatable with respect to said linear guiding plate;
    a linear guiding groove which is provided on said barrel, wherein a guided projection formed on said linear guiding plate is slidably engaged in said linear guiding groove of said barrel to guide said linear guiding plate in said optical axis direction; and
    a driving gear for rotating said cam ring, wherein said driving gear is positioned in said linear guiding groove with an axial direction of said driving gear being parallel to said linear guiding groove, and wherein said driving gear is engaged with a circumferential gear formed on an outer peripheral surface of said cam ring, said guided projection of said linear guiding plate being provided in the vicinity of said driving gear.

10. The linear guiding mechanism of claim 9, wherein said guided projection includes a recessed portion and a pair of projections which are formed on both sides of said recessed portion.

11. The linear guiding mechanism of claim 10, wherein said recessed portion recedes from said gear, with said gear positioned between said pair of projections, and further wherein said pair of projections slidably engage with said linear guiding groove.

12. The linear guiding mechanism of claim 9, a section of said linear guiding groove of said barrel comprising an elongated hole, and a remaining section of said linear guiding groove of said barrel comprising a blind-end groove on an inner peripheral surface of said barrel.

13. The linear guiding mechanism of claim 9, said cam ring comprising a circumferential gear on an outer peripheral surface of said cam ring, and said barrel comprising a gear which is engaged with said circumferential gear for rotating said cam ring.

14. A linear guiding mechanism of a zoom lens barrel of a photographing optical system, comprising:
    a stationary block connected to a camera body;
    a barrel slidably connected to said stationary block and having a rotation restricting portion, said stationary block determining an opening to accommodate said barrel and comprising a linear groove to slidably engage said rotation restricting portion of said barrel;

a cam ring threadedly engaged with said barrel on an inside of said barrel;

a linear guiding plate for linearly guiding the photographing optical system in an optical axis direction, wherein said linear guiding plate is movable together with said cam ring in said optical axis direction, and wherein said cam ring is rotatable with respect to said linear guiding plate; and a linear guiding portion formed on said barrel for guiding said linear guiding plate in said optical axis direction, wherein a section of said linear guiding portion is formed as an elongated hole, and wherein a remaining section of said linear guiding portion is formed as a blind-end groove on an inner peripheral surface of said barrel.

15. The linear guiding mechanism of claim 14, said rotation restricting member comprising a projection on an outer peripheral surface of said barrel, wherein an inner portion of said projection forms a bottom of said blind-end groove.

16. The linear guiding mechanism of claims 14, wherein said linear guiding plate comprises at least one guided projection which is guided by said linear guiding portion in said optical direction.

17. The linear guiding mechanism of claim 16, wherein said cam ring includes a circumferential gear on an outer peripheral surface of said cam ring, and wherein said barrel includes a driving gear which is engaged with said circumferential gear for rotating said cam ring.

18. The linear guiding mechanism of claim 17, wherein said guided projection includes a recessed portion formed by a pair of projections on both sides of said recessed portion, and wherein at least a portion of said driving gear is positioned between said pair of projections.

* * * * *